United States Patent
Appeltauer et al.

(10) Patent No.: US 6,212,738 B1
(45) Date of Patent: Apr. 10, 2001

(54) METHOD AND DEVICE FOR FIBRE PRODUCTION

(75) Inventors: Jiří Appeltauer, Žamberk; Václav Maixner, Dolnf Dobrouč; Jaroslav Hájek, Kunvald; Štefan Jánošík, Žamberk; Václav Polák, Česká Třebová, all of (CS)

(73) Assignee: Rieter Elitex A.S., Orlici (CS)

( * ) Notice: Subject to any disclaimer, the term of this patent is extended or adjusted under 35 U.S.C. 154(b) by 0 days.

(21) Appl. No.: 09/355,513

(22) PCT Filed: Feb. 5, 1998

(86) PCT No.: PCT/CZ98/00005

§ 371 Date: Dec. 13, 1999

§ 102(e) Date: Dec. 13, 1999

(87) PCT Pub. No.: WO98/35077

PCT Pub. Date: Aug. 13, 1998

(30) Foreign Application Priority Data

Feb. 7, 1997 (CS) .................................................... 367-97

(51) Int. Cl.$^7$ .................................................. D01G 15/00
(52) U.S. Cl. .................................. 19/98; 19/105; 19/200; 19/204
(58) Field of Search ................................ 19/98, 99, 100, 19/101, 105, 106 R, 112, 200, 203, 204, 205, 65 A, 240

(56) References Cited

U.S. PATENT DOCUMENTS

| | | | | |
|---|---|---|---|---|
| 4,785,505 | * | 11/1988 | Leifeld | 19/105 |
| 4,860,406 | * | 8/1989 | Staheli et al. | 19/105 |
| 5,014,395 | * | 5/1991 | Staheli et al. | 19/105 |
| 5,333,358 | | 8/1994 | Leifeld . | |
| 5,479,679 | | 1/1996 | Leifeld . | |
| 5,586,366 | * | 12/1996 | Leifeld et al. | 19/105 |
| 5,611,116 | | 3/1997 | Leifeld . | |
| 5,613,278 | * | 3/1997 | Temburg | 19/105 |

FOREIGN PATENT DOCUMENTS

| | | |
|---|---|---|
| 242702 | 5/1987 | (CS) . |
| 255402 | 11/1988 | (CS) . |
| 54992 | 9/1992 | (CS) . |
| 277232 | 10/1992 | (CS) . |
| 4334035 | 6/1994 | (DE) . |

OTHER PUBLICATIONS

International Preliminary Examination Report, PCT/CZ 98/00005, dated Jan. 25, 1999.
International Search Report, PCT/CZ 98/0005, dated Jul. 6, 1998.

* cited by examiner

*Primary Examiner*—John J. Calvert
*Assistant Examiner*—Gary L. Welch
(74) *Attorney, Agent, or Firm*—Dority & Manning

(57) ABSTRACT

A method and apparatus for fibre production by recycling waste fibre material includes pressing the waste fibre material with a pressure element along a contact pressure line onto a surface of a feed roller. The pressure force of the pressure element is variable along the length of the contact pressure line depending on the thickness of the fibre material at a respective position on the contact pressure line so that a thick fibre material does not substantially influence processing of a thinner fibre material along the contact pressure line. The pressure element is radially adjustable relative to the feed roller and is configured with at least one adjusting end pressured device. The pressure element may also be adjustable along the circumference of the feed roller.

12 Claims, 2 Drawing Sheets

METHOD AND DEVICE FOR FIBRE PRODUCTION

TECHNICAL FIELD

The invention relates to a method and device for fibre production, in particular by recycling otherwise waste fibre materials such as flax and cotton waste, waste of carpets and textile fabrics, other natural and synthetic fibre materials, sandwich fibre containing materials and composite materials with non-metallic fibre reinforcement such as tires with non-metallic cord, in which the fibre material is pressed in a contact pressure line by a thrust onto a feed roller fitted with articulated surface, and is taken off the contact pressure line by an opener roller.

BACKGROUND

In the traditional method of textile fibre opening, separate fibre layers or tuffs are taken from pressed fibre bales in the opening rooms of spinning mills and continuously opened on feeders, beater openers, and scutchers into fibre tuffs which are fed then in the form of a roll or directly from hopper shafts to be singled out on carding machines with carded sliver as the final product.

In technological respect, this traditional method of fibre opening unavoidably affects the final product, especially if the material to be opened and cleaned is considerably soiled, because the fibre tuffs, while passing in succession through a series of cleaning and opening stations, get closed, so that the impurities contained therein are very difficult to exclude while the fibres are singled out on carding machines. Fine or not strong enough fibres are more or less damaged by this operation. To do away with these drawbacks, several measures have been proposed in the form of additional devices intended still further to open and clean the fibre tuffs before the carding operation proper.

The drawback of such additional devices consists in that they only additionally solve the problem of the opening and cleaning of the fibre material and are made either as separate pre-cleaning machines intended to prepare the fibre material before the singling out process proper or as a mere modification of the feed device of the carding machine. Besides, they require additional floor space and involve complications in the pneumatic distribution lines serving to suck off dust, impurities, and waste.

To remove this drawback, there has been proposed a solution disclosed in the CS AO 242702 relating to the mechanical stripping of feathers or to the opening and cleaning of textile materials. A device is disclosed in which the materials are brought in a uniform layer by a feed path suitable for the material in question into contact with a plurality of systems of opener rollers whose surfaces are fitted with opener members made as points, teeth, needles, or otherwise roughened areas. In the direction of the material feed, both the roller speed and the density of the opener members of each system increase. During the opening process, the impurities are separated either by spontaneously falling out or by hitting the stationary or rotating cleaning members appropriately arranged near the opener rollers. The opening and separation of impurities are followed by the mixing, usual doffing, and sucking off, of the opened material.

The drawback of this solution consists in that it is only applicable to the opening and cleaning of chips of woven and knitted fabrics or yarn bundles and of chips of soft needle-processed webs or of soft felt, but not to compact and relatively strong woven fabrics of fibre waste.

Another well-known solution of a device for opening, cleaning, and singling out of the fibre material, disclosed in the CS AO 255402, is based on the use of a single continuous device in which the fibre tuffs are in succession opened, cleaned, and singled out to separate fibres, the final product being a sufficiently cleaned carded sliver suitable, among others, to be spun on open-end spinning machines. Related to each opener and singling out roller, are driven under pressure perforated rollers fitted with saw-shaped cover for doffing the fibre material from these opener or singling out rollers. The reason why the arrangement of the perforated doffing rollers, in functional relation to the opener and singling out rollers from whose working surface the fibre material in process of opening and singling out is doffed and cleaned, increases the effect consists among others in that these operations are carried out on a singled combined device in which the efficiency of the opening, cleaning, and singling-out can be modified by the number of the opener, singling out, and perforated doffing rollers.

However, the drawback of this device consists exactly in the necessity to use perforated doffing rollers, thus increasing both the amount of energy needed for the whole process of opening, singling out and cleaning of the fibre material and the complexity and investment costs of the device. Besides, the device manages to process only the fibre material presented in the form of fibre tuffs.

An improvement on the just described solution is disclosed in the patent specification CZ PS 277 232 comprising waste containers situated under each opener or singling out roller and used to feed the primary mixed waste from the respective section of the device back to its inlet section. This, on the one hand, reduces the fibre loss but, on the other hand, increases the complexity, and consequently the investment costs, of the device which, like the preceding one, manages to process only the fibre material presented in the form of fibre tuffs.

Another solution, described in the state of art of the patent specification CZ PV 00549-92, relates to a machine for the opening and breaking of textile materials fitted with a feed device intended to feed the textile products or waste materials through a group of breaking units arranged in a line out of which each breaking unit contains a breast drum or breast roller carrying on its circumference pegs or needles and at least one rotating feed roller situated in front of the breast drum or roller and at the same time at the end of a feed belt. Behind the breast drum or roller, the material being processed is gathered on a gathering plate and is sucked into a perforated rotating drum in which an air exhauster maintains under pressure and acts as a filter. Situated on the lower side of said breaking machines is a feed belt used to feed the unbroken parts of rags or fibres back into the inlet feed system.

This type of breaking machine is made in unit construction system, in other words, the fibres pass through a plurality of construction units, each of them fitted with a breaking device comprising a breast drum and related complementary parts, and each of them acting as one breaking step or breaking station. Such well-known machines comprise two to six breaking stations, and the fibre material inevitably must pass through every and all stations of the machine in question in order to be gathered at the outlet of the last breast drum.

In practice, however, some fibre types require to be processed on a comparatively large number of breaking stations arranged in a line while other fibre types require the use of only one or two breaking stations arranged in a line.

This involves the necessity to have a number of machines different from each other only by the number of breaking stations arranged in a line and consequently correspondingly high investment costs of such a machine set.

This problem has been solved by the patent application CZ PV 00549-92 published on the 16.09.1992 and disclosing a breaking machine comprising an inlet filling station equipped with a first feed hopper for supplying waste material, and with a second feed hopper, each of the two types of fibre material being supplied separately to the inlet feed belt. The machine comprises a plurality of breaking stations with there between situated groups of ventilators equipped with lateral inlet apertures adapted to be closed by doors and feeding the material being processed from the preceding breaking station into a separation box in whose inner space the dust is separated on a sharp bow of a pipeline with perforated outer part on which the dust passes through the perforation apertures while the fibre material falls down and is either fed to the next breaking station or, if, the fibre material has been sufficiently processed, it is fed to the machine end by the outlet pipeline.

The drawback of this solution consists in the necessity to use ventilators and a pipeline for feeding and cleaning the fibre material and in the accordingly higher investment costs of such machines.

The present invention intends to do away with, or at least to reduce to a minimum, the drawbacks inherent to the state of art.

SUMMARY

A goal of the invention has been reached by a method of fibre production whose principle consists in that the value of the pressure force varies throughout the length of the contact pressure line depending on the thickness of the fibre material in the contact pressure-line, thus eliminating the influence of the variations in the thickness of the fibre material on the course of its opening process.

Preferably, the position of the contact pressure line on the circumference of the roller is adjustable around said circumference of said feed roller, thus permitting to obtain the required staple length of the fibres in process of production.

The principle of the device for carrying out the method of production according to the invention consists in that there is provided a pressure element made as a holding member embracing an articulated surface of the feed roller on a part of its circumference and adapted to swing and to be radially adjustable with respect to the articulated surface of the feed roller, while being at the same time coupled with an adjusting and pressure device, thus achieving the opening even of very strong fibre containing materials and at the same time the possibility of readjusting the device quickly and exactly to another type of fibre material.

The holding member is preferably made as an elastic element preferably coupled with at least two independent adjusting and pressure devices so as to obtain a more perfect distribution of the thrust (pressure force) throughout the length of the contact pressure line.

The principle of another preferred embodiment of the device for carrying out the method of the fibre production according to the invention consists in that the pressure element is made as a holding member comprising at least two segments embracing the articulated surface of the feed roller on a part of its circumference, each of the two segments being adapted to swing and to be radially adjustable with respect to the articulated surface of the feed roller while being at the same time coupled with an independent adjusting and pressure device so as to obtain a more perfect distribution of the thrust (pressure force) throughout the length of the contact pressure line and to reduce to a minimum the influence of the elastic deformation of the pressure element on the fibre material opening process.

The pressure element is preferably seated adjustably around the circumference of the feed roller, thus permitting adjustment a predetermined staple length of the fibres to be produced.

According to another preferred embodiment of the device for carrying out the method of the fibre production according to the invention, the feed roller is preceded by a feed belt vertically adjustable with respect to the rotation axis of the feed roller and thus able to optimize the conditions under which the fibre material is fed to the feed roller.

According to still another preferred embodiment of the device for carrying out the method of the fibre production according to the invention, at least one cleaning means is related to the upper part of the circumference of at least one opener roller so as to increase the efficiency of the cleaning component of the process of opening and cleaning the fibre material by increasing the cleanliness of the surface of the opener roller fitted with cleaning means arranged in such position.

DESCRIPTION OF THE DRAWINGS

An example of an embodiment of the device for carrying out the method of the fibre production according to the invention is shown in the accompanying drawings in which.

DETAILED DESCRIPTION

Figure 1:
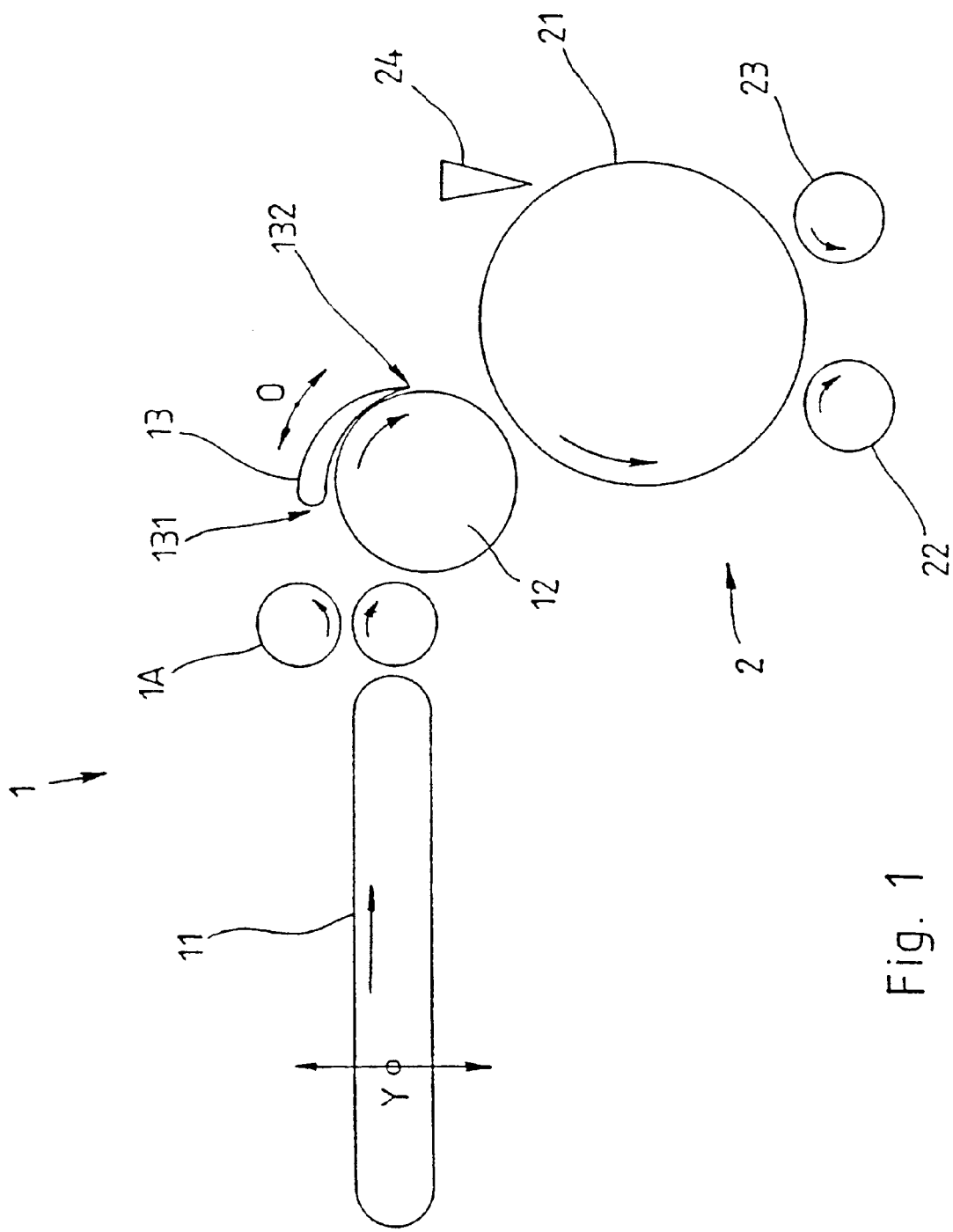
FIG. 1 shows the arrangement with the feed belt.

Reference is now made to preferred embodiments of the invention, one or more examples of which are illustrated in the drawings. Each example is provided as an explanation of the invention, and not meant to limit the invention. It should be understood that various modifications and variations can be made in the invention without departing from the scope and spirit of the invention.

Figure 2:
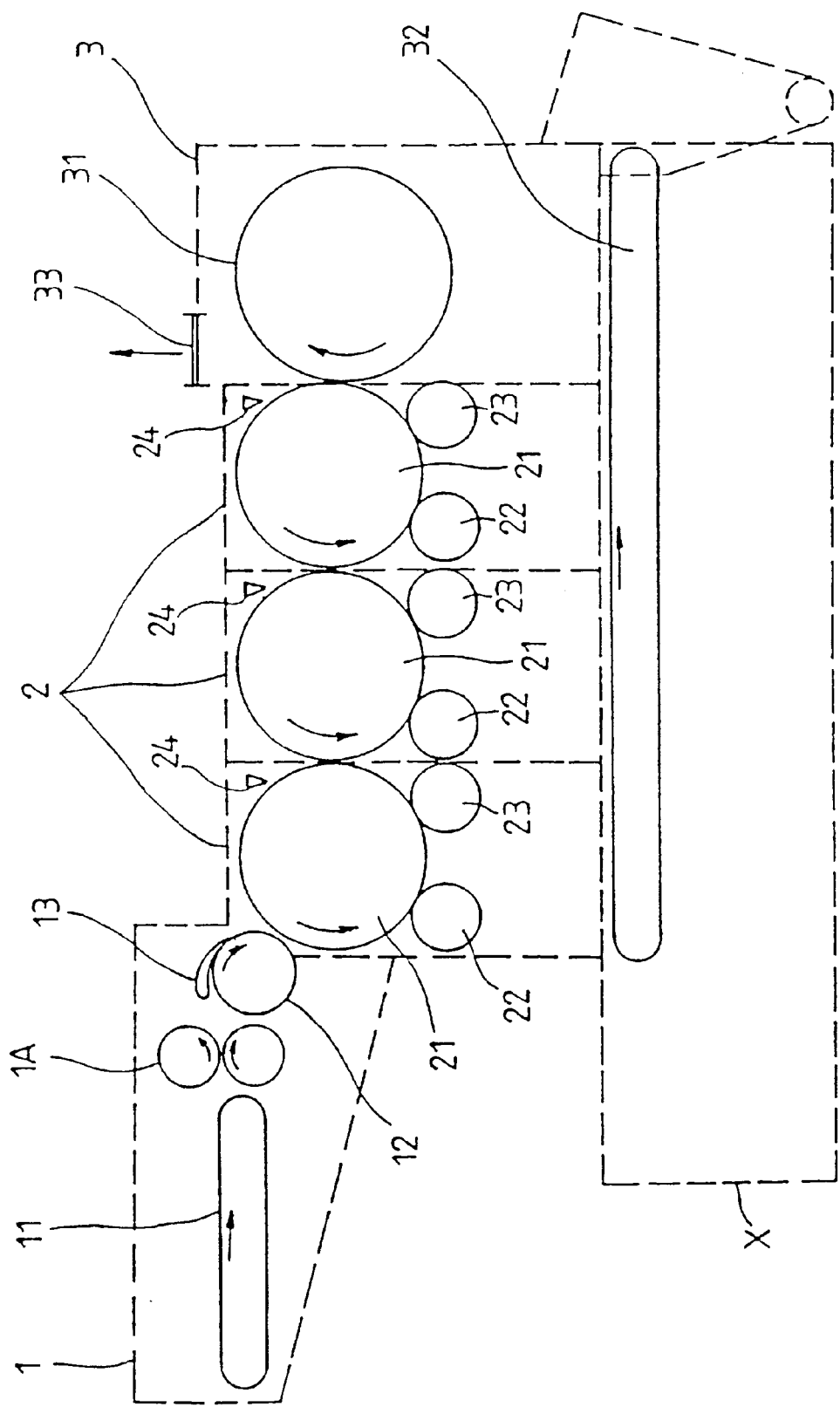
FIG. 2 shows the elevation view of the general arrangement of the device equipped with three opening and cleaning sections.

The device for fibre production from fibre materials, in particular by recycling suitable waste fibre materials such as flax and cotton waste, waste of carpets and textile fabrics, other natural and synthetic fibre materials, composite materials with non-metallic fibre reinforcement such as tires with non-metallic cord, etc., comprises a feed device 1, at least one opening and cleaning section 2, and an outlet section 3 (FIG. 2).

In the example of embodiment shown in FIGS. 1 and 2, the feed device 1 contains a well-known feed belt 11 seated in a frame X. After said feed belt 11, considered in the direction of the material feed, the frame X carries a rotatably seated feed roller 12 whose articulated surface is equipped with a well-known saw-shaped surface, and the position of the functional area of the feed belt 11 with respect to the rotation axis of the feed roller 12 is vertically adjustable as shown in FIG. 1 by the direction Y. The feed device can also contain a rotatably mounted cylinder detector 1A of metallic particles and of other hard material that may be situated either in front of, or behind,, the feed belt 11, considered in the direction of the fibre feed.

In another, not illustrated embodiment, the device also comprises a well-known ancillary feed device containing at least one ancillary roller for stretching the fibre material entering the contact pressure line. Considered in the direction of the fibre feed, said ancillary feed device is situated in front of the feed roller 12, and the position of the ancillary feed device with respect to the rotation axis may be vertically adjustable.

Above the feed roller 12, and parallel to it, the frame X of the device carries a holding member 13 adapted to swing and adjustable with respect to the articulated surface of the feed roller 12. Holding member 13 embraces the articulated surface of the feed roller 12 and thus creates between the feed roller 12 and the holding member 13 a channel continuously narrowing from the inlet edge 131 of the holding member 13 to the outlet edge 132 of the holding member 13. Although not illustrated, the holding member 13 may be coupled with a set screw and a spring forming in common a pressure device enabling to set both its optimum position with respect to the feed roller 12 and the pressure force value. In another embodiment, the holding member 13 may be coupled with an adjusting and pressure device that can contain well-known pneumatic or hydraulic cylinders and elements.

In still another embodiment, the holding member 13 can be made as an elastic element coupled with at least two adjustment and pressure devices.

Both the distance between the inlet edge 131 of the holding member 13 and the circumference of the feed roller 12 and the minimum distance between the outlet edge 132 of the holding member 13 and the articulated surface of the feed roller 12 are adjustable. The position of the holding member 13 with respect to the circumference of the feed roller 12 around this circumference of the feed roller 12 is also adjustable, as illustrated in FIG. 1 by the direction O, co-determining the position of the feed belt 11 with respect to the rotation axis of the feed roller 12. Consequently, the position of the holding member 13 with respect to the circumference of the feed roller 12 and its distance from the articulated surface of this feed roller 12 depends on the thickness, type, and on the square weight, of the material, as well as on the required staple length of the fibres to be produced.

In another embodiment, the holding member 13 comprises a plurality of segments adapted to swing in a common frame, each segment being coupled with its own adjusting screw and with its own spring for adjusting both its optimum position with respect to the articulated surface of the feed roller 12 and its optimum pressure force. In another embodiment, each segment of the holding member 13 is coupled with an independent well-known pneumatic cylinder and with an independent adjustment device for adjusting the thrust value and the optimum position of each segment of the holding member 13 with respect to the articulated surface of the feed roller 12. In still another embodiment, each segment of the holding member 13 can be coupled with quite a general adjustment and pressure device which can be linked to a central control so as to permit use of computer technology for controlling the process of adjustment and regulation of the position and value of thrust of each segment of the holding member 13 in the direction of the articulated surface of the feed roller 12.

The contact line of the outlet edge 132 of the holding member 13 and of the feed roller 12 is called the contact pressure line.

In the direction of the fibre material feed, a first opening and cleaning section 2 is situated behind the feed device 1 comprising an opener roller 21 rotatably mounted in the frame of the device and whose axis of rotation is parallel to the axis of rotation of the feed roller 12. The surface of the opener roller 21 is fitted with projections such as saw-shaped teeth or needles. In a particular embodiment, the functional surface of the opener roller 21 is fitted with a well-known saw-shaped cover.

In the frame X, under the lower section of the circumference of the opener roller 21, there are in a well-known manner situated cleaning means 22 and 23 made in the example shown in FIG. 2 as well-known bouncing knives freely adhering to the articulated surface of the opener roller 21 and connected to a well-known device for the removal of impurities separated from the fibres during the opening and cleaning process. In another embodiment, the cleaning means 22 and 23 are made as well-known combing bars or as other cleaning means.

In the upper half of the opener roller 21, an upper cleaning means 24 adheres to its articulated surface, also connected to the well-known device for the removal of impurities, and used for cleaning said surface of the opener roller 21 from impurities clinging to it.

Situated after the first opening and cleaning section in the direction of the material feed, are seated a second and third and, as the case may be, a fourth and fifth opening and cleaning section 2, with both the circumferential velocity of the opener rollers 21 and the density of projections on their articulated surfaces increasing in the direction of the material feed. The total number of such opening and cleaning sections 2 depends on the type of the fibre material to be processed and on the required final purity of each component at the outlet of the device.

In the example of embodiment shown in FIG. 2, three opening and cleaning sections 2 are situated after the feed device.

In the direction of the material feed, the last opening and cleaning section 2 is followed by an outlet device 3 comprising a collecting roller 31 rotatably mounted in the frame X and whose axis of rotation is parallel to the axis of rotation of the feed roller 12. The outlet device 3 also comprises an outlet belt 32 for the removal of impurities separated from the fibres in the process of the fibre opening and cleaning followed by an outlet mouth 33 for the outlet of opened and cleaned fibres. The outlet belt 32 may pass through the whole device from the opener roller 21 of the first opening and cleaning section 2. To improve the feed of opened and cleaned fibres into the outlet mouth 33, air is additionally sucked into the area behind the collecting roller 31.

The fibre material such as flax and cotton waste, waste of carpets and textile fabrics, other natural and synthetic fibre materials, tires with non-metallic cord, etc. is laid into the device manually or mechanically, not necessarily in a single layer but so oriented as to facilitate the introduction of the fibre material into the contact pressure line by means of the friction existing between said fibre material and the articulated surface of the feed roller 12 and of the holding member 13.

The fibre material is deposited on the feed belt 11 leading it to the detector 1A of metallic particles and other hard material and to the feed roller 12 by which it is gripped and led into the continuously narrowing channel between the feed roller 12 and the holding member 13. The position of the contact pressure line with respect to the opener roller 21, the "dimension" of the channel narrowing down between the feed roller 12 and the holding member 13, and the value of the pressure force of each segment of the holding member 13 in the direction of the articulated surface of the feed roller 12 will be pre-set by a related adjusting and pressure device depending on the thickness and type of the fibre material to be processed. The fibre material is led into the contact pressure line in which it is held by the pressure force exerted by the segments of the holding member 13 on the surface of the feed roller 12. The tilting mounting of each segment of the holding member 13 prevents the function of the device from failing when a variably thick layer such as mutually superposed bits of fibre material gets into the contact pressure line. In such a case the respective segment of the holding member 13 tilts more than the other segments of the holding member 13 which continue to exert constantly high pressure force on the thinner layer of the fibre material. After the thicker layer of the fibre material has been opened, each of the more tilted segments of the holding member automatically resumes its original position.

The fibres are drawn out of the contact pressure line by getting caught on the projections of the articulated surface of the opener roller 21 and are fed by the opener roller 21 on these projections along the cleaning means 22 and 23 where impurities are separated from them whereupon said fibres are handed over for further opening and cleaning to the following opener roller 21 of the following opening and cleaning section 2. The whole process of the fibre passage from the opener roller 21 of one opening and cleaning section to the opening roller 21 of the next opening and cleaning section with the following movement of the fibres in process of opening along the cleaning means 22 and 23 is repeated according to the number of opening and cleaning sections 2 included in the device.

Since both the total number of projections on the articulated surface of the opener roller 21 and its circumferential velocity are superior to those of the preceding opener roller 21, no opening and cleaning section is in danger of getting clogged.

A part of impurities and fibre remainders remains clinging to the articulated surfaces of the opener roller 21 even after the fibres have been handed over from the articulated surface of one opener roller 21 to the articulated surface of the next opener roller 21. These impurities are removed by the upper cleaning means 24 situated behind the area where the fibres are doffed from the articulated surface of the opener roller 21 in question, i.e., on the section of the circumference of the opener rollers 21 opposite to that of the well-known cleaning means 22 and 23.

The opened and cleaned fibres are doffed by the collecting roller 31 from the articulated surface of the last opening roller 21 and are in a well-known manner handed over for further processing into the area of the outlet mouth 33 to be fed for further processing. The outlet mouth may be oriented either horizontally or vertically. In the embodiment shown in FIG. 2, the outlet mouth 33 is oriented vertically in order to use at least a part of the kinetic energy of the opened and cleaned fibres for facilitating their transport to the area of the outlet mouth 33, supported also by the air suction into the area.

The "impurities" separated from the fibres during the process are put on the outlet belt 32 and in a well-known way removed (fed further on). Their utility value is sometimes superior to that of the fibres proper, for instance in case of bonding agents for sandwich materials or carpets, and they can be utilized accordingly.

It should be appreciated by those skilled in the art that various modifications and variations can be made in the present invention that may not be described herein. It is intended that the present invention include such modifications and variations as come within the scope of the appended claims and their equivalents.

What is claimed is:

1. A method of fibre production by recycling waste fibre material comprises pressing the waste fibre material with a pressure force element along a contact pressure line onto an articulated surface of a feed roller;

adjusting the radial distance between the pressure force element and the feed roller as a function of the type of fibre material to be processed:

varying the pressure force along the length of the contact pressure line as a function of the thickness of fiber material at a respective position on the contact pressure line so that a thick fiber material does not substantially influence processing of a thinner fiber material along the contact pressure line; and taking fibers away from the feed roller and contact pressure line with an opener roller.

2. A method of fibre production by recycling waste fibre material comprises pressing the waste fibre material with a pressure force along a contact pressure line onto an articulated surface of a feed roller:

varying the pressure force along the length of the contact pressure line as a function of the thickness of fiber material at a respective position on the contact pressure line so that a thick fiber material does not substantially influence processing of a thinner fiber material along the contact pressure line; and taking fibers away from the feed roller and contact pressure line with an opener roller; and further comprising adjusting the circumferential position of the contact pressure line on the feed roller as a function of staple length of the fiber material to be processed.

3. A device for fiber production from generally waste fiber material, said device comprising:

a rotatable feed roller having an articulated surface;

an opener roller disposed downstream of said feed roller to take fibers away from said feed roller;

at least one cleaning device configured with said opener roller along a bottom circumferential portion thereof to remove impurities from the fiber material transferred to said opener roller from said feed roller; and a pressure element configured opposite to said feed roller articulated surface, said pressure element further comprising a holding member operably coupled to at least one adjusting and pressure device such that said holding member is variably positionable relative to an axis of the feed roller for adjusting an initial radial distance between said holding member and the articulated surface of said feed roller for different types of fiber material.

4. The device as in claim 3, wherein said holding member is and elastic element.

5. The device as in claim 3, wherein said cleaning device is a knife cleaning device.

6. The device as in claim 3, wherein said holding member is comprised of a plurality of segments, each segment being radially adjustable and coupled with an independent said adjusting and pressure device.

7. The device as in claim 3, wherein said pressure element is adjustably positionable along said feed roller articulated surface.

8. The device as in claim 3, Further comprising a feed belt disposed upstream of said feed roller and vertically adjustable relative to a rotational axis of said feed roller.

9. The device as in claim 3, further comprising at least one upper cleaning device disposed relative to an upper circumferential portion of said opener roller.

10. A device for fiber production from generally waste fiber material, said device comprising:

a rotatable feed roller having an articulated surface;

an opener roller disposed downstream of said feed roller to take fibers away from said feed roller:

at least one cleaning device configured with said opener roller along a bottom circumferential portion thereof to remove impurities from the fiber material transferred to said opener roller from said feed roller; and a pressure element configured opposite to said feed roller articulated surface, said pressure element adjustably positionable along a portion of the circumference of said feed roller.

11. The device as in claim 10, further comprising a feed belt disposed upstream of said feed roller and vertically adjustable relative to a rotational axis of said feed roller.

12. The device as in claim 10, further comprising at least one upper cleaning device disposed relative to an upper circumferential portion of said opener roller.

* * * * *